Figure 6:
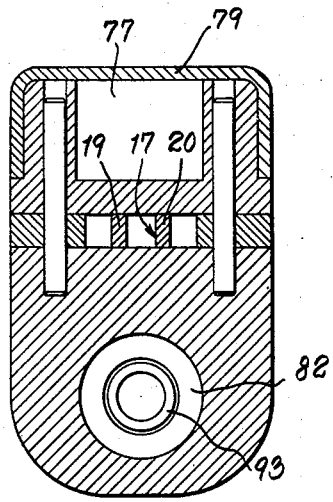

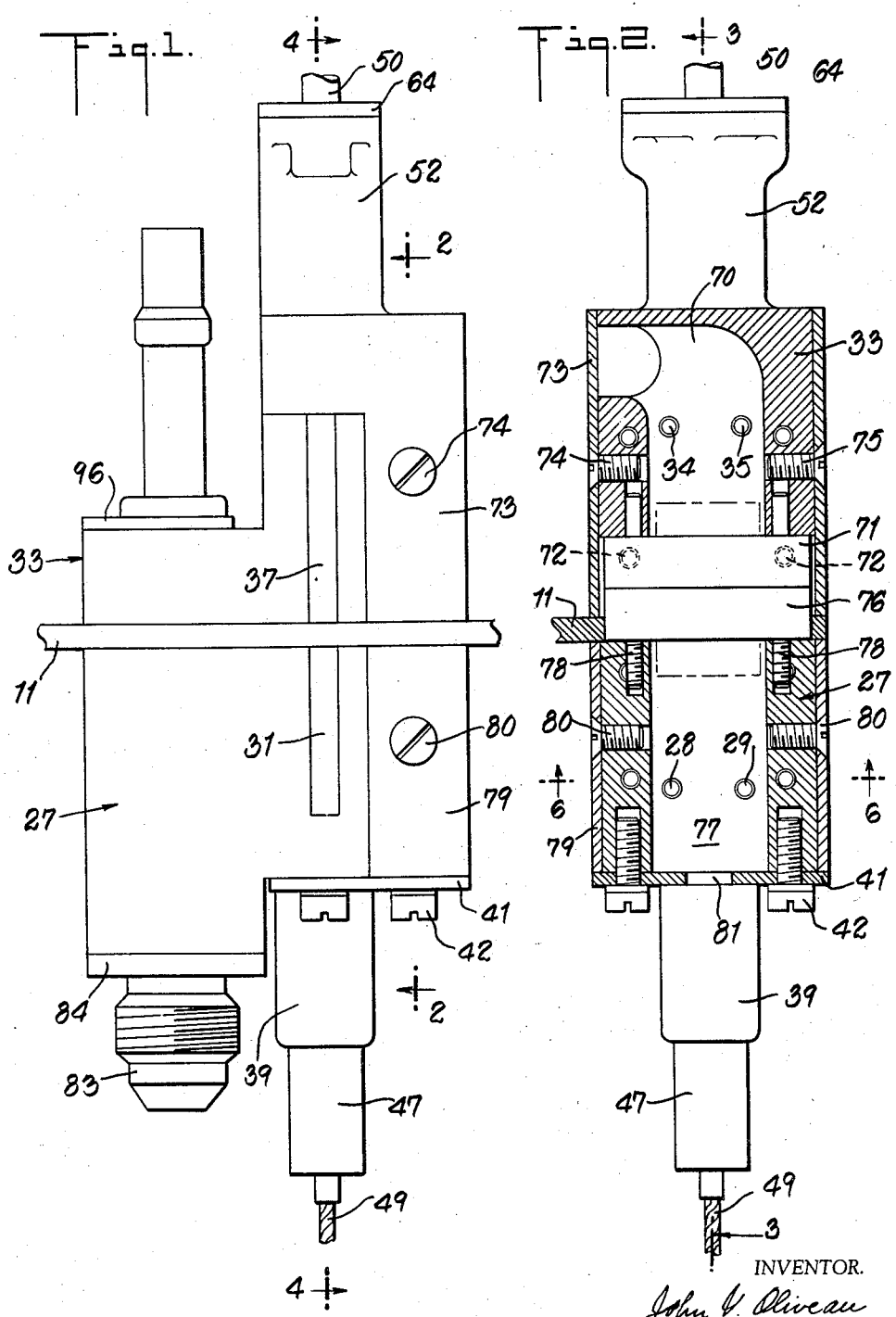

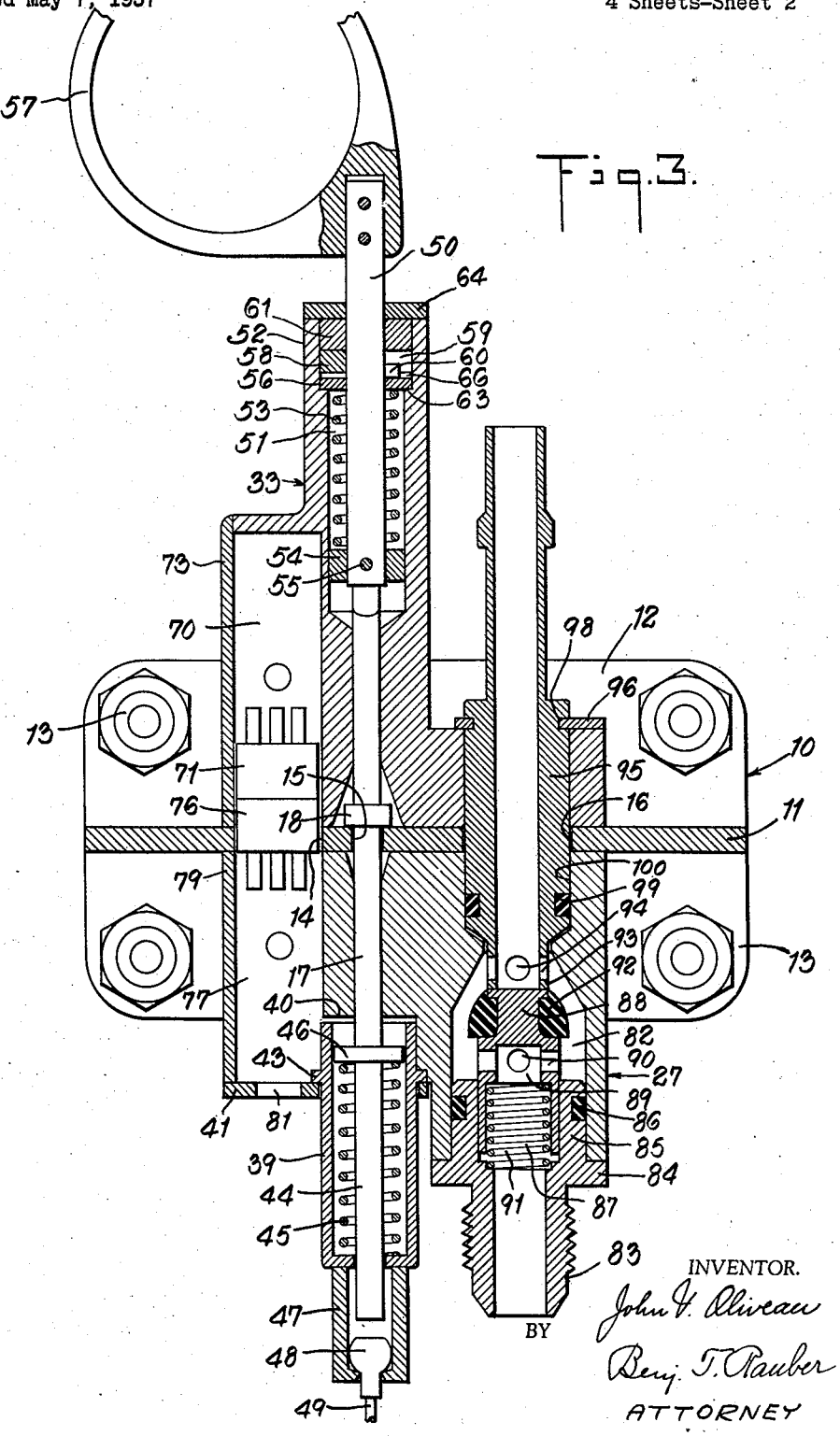

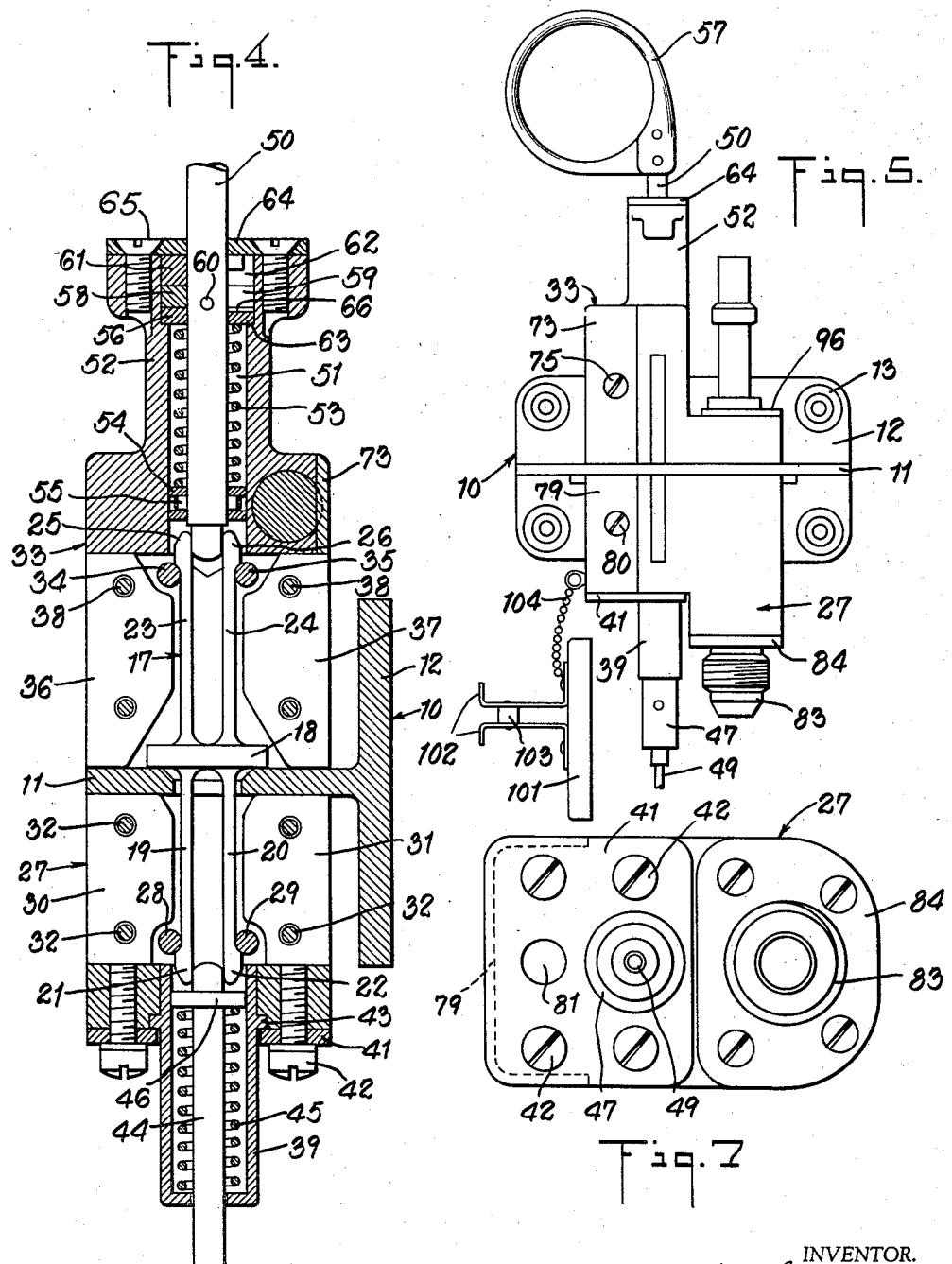

Nov. 4, 1958 J. V. OLIVEAU 2,859,422
DISCONNECTS FOR AIRCRAFT
Filed May 7, 1957 4 Sheets-Sheet 4

INVENTOR.
John V. Oliveau
BY
Benj. T. Rauber
ATTORNEY

United States Patent Office 2,859,422
Patented Nov. 4, 1958

2,859,422

DISCONNECTS FOR AIRCRAFT

John V. Oliveau, Greenwich, Conn., assignor to The Aerotec Corporation, Greenwich, Conn., a corporation of Connecticut Application May 7, 1957, Serial No. 657,550

14 Claims. (Cl. 339—16)

My invention relates to disconnects for aircraft.

Disconnects for aircraft are provided to disconnect the electric circuits and the oxygen supply from the aircraft to the pilot or other personnel when ejected from the aircraft upon bailing out in an emergency or when leaving the aircraft.

My invention provides a disconnect which may be of small size and weight, in which the various elements may be constructed and assembled with a minimum of cost and in which the disconnects may be locked against accidental release by the pilot or other personnel and in which the position of the locking element of the disconnect may be adjusted to the requirements of the aircraft.

In my invention, the disconnect is mounted on a bracket secured to the seat of the aircraft and having a horizontal plate, on the upper face of which is secured an upper, separable, part and to the lower face of which is secured a lower, separable, part by a detent lock which locks both parts together. The detent lock is formed of a narrow, vertical, flat, metal plate widened intermediate its upper and lower ends to rest on the upper face of the horizontal bracket plate and bifurcated from its upper and lower ends to form a pair of legs extending downwardly through an opening or slot in the bracket plate and widened sidewise at their lower ends and a similar pair of upwardly extending legs. The lower part of the disconnect has a recess to receive the downwardly extending legs of the detent lock and spaced locking surfaces between which the lower, widened, ends of the detent lock pass, the legs springing slightly inward toward each other until the sidewise enlargements pass below the locking surfaces and then springing apart to secure the lower part against the lower face of the bracket plate. Similarly the upper part of the disconnect is provided with an upwardly extending recess and locking surfaces into which the upwardly extending legs of the detent lock pass and lock the upper part to the lower part with its lower surface on the upper surface of the bracket plate.

Both the upper and lower parts of the disconnect comprise each a single block of metal. The recess to receive the detent lock is formed in the respective blocks by a transverse slot of a width equal to the thickness of the detent lock, the slot extending upwardly from the lower face of the upper block and downwardly from the upper face of the lower block. The sides of the slots are closed by filler pieces in which the locking surfaces may be formed. These locking surfaces are, however, preferably and more simply formed by spaced rods extending through the slot in position to receive the ends of the detent lock.

The sidewise extensions of the legs of the detent lock are inclined so that they slide between the locking surfaces or rods compressing the legs inwardly and, accordingly, the legs may be inserted or withdrawn by a sufficiently forceful push or pull. To positively lock the detent lock in the recess a release rod is provided to slide vertically in its block and spring pressed so that its end passes into a position between the legs of the detent lock to prevent these legs from being pressed inwardly. When the end of a detent lock is inserted into a recess it pushes back the release rod until the end of the detent lock has passed between the locking surfaces of the recess and spring outwardly and then is returned to position between the legs of the detent lock. The release rod of the lower part is connected by a lanyard secured to the aircraft so that when the seat is ejected the release rod is pulled free of the detent lock and the lower part is pulled free of the upper part and the bracket.

The release rod of the upper part is manually movable from locking position. It is rotatable on its axis from one position in which it is freely movable longitudinally to another position in which it is locked against withdrawal. This locking of the release rod is obtained by a pin extending radially and slidably vertically with the release rod in a narrow, longitudinal slot in a filler disc in the block to a wider slot in an inner or lower filler disc in the block in which the pin may be given a quarter turn out of alignment with the narrower slot of the outer filler disc. These filler discs may be adjusted and locked to place the slots in a selected angular position relative to the upper part. Complete withdrawal of the locking and release rod is prevented by a cap plate through which the rod extends and which holds the filler discs in place.

The blocks of the upper and lower parts are provided with sidewise opening recesses to receive the upper and lower terminals of the electric circuits, which may be assembled separately from the blocks and mounted on their respective blocks as a unit assembly and the recess closed by a plate. The upper part and lower part of the oxygen conduits may be put in their respective blocks and secured in position.

Figure 8:
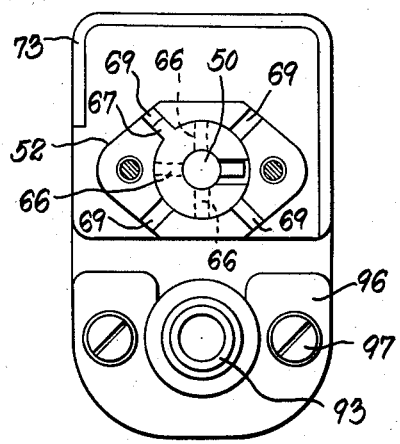
Figure 9:
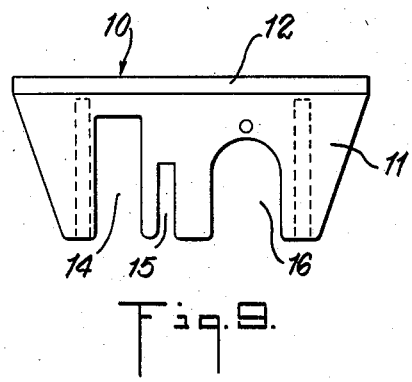
Figure 10:
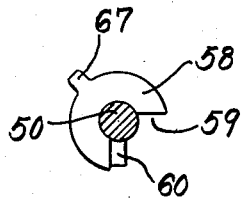
Figure 11:
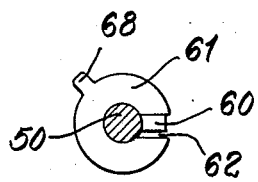

The various features of my invention are illustrated by way of example in the accompanying drawings, in which:

Fig. 1 is a front elevation of a disconnect embodying a preferred form of my invention, Fig. 2 is a vertical section on line 2—2 of Fig. 1, Fig. 3 is a vertical section on line 3—3 of Fig. 2 transverse to the section of Fig. 2, Fig. 4 is a vertical section on line 4—4 of Fig. 1, Fig. 5 is a rear elevation of the disconnect, Fig. 6 is a horizontal section on line 6—6 of Fig. 2, Fig. 7 is a bottom plan of the disconnect, Fig. 8 is a plan of the disconnect, part of the cap plate being broken away to show the filler discs, Fig. 9 is a plan of the seat bracket, and, Figs. 10 and 11 are detail views of the filler discs.

As shown more particularly in Figs. 4, 5 and 9 in the accompanying drawings, the elements of the disconnect are mounted on a bracket 10 having a horizontal plate 11 projecting sidewise from a vertical plate 12 which is secured to a seat, not shown, by bolts or screws 13. In the plate 11 there is provided an opening 14 for the electric elements, an opening 15 for the detent lock and an opening 16 for the oxygen connections, these openings being illustrated in the example shown as sidewise opening slots.

Mountable in the opening 15 is a detent lock 17, shown more particularly in Figs. 3 and 4. The detent lock is formed of an elongated strip of metal having a widened portion 18 to seat on the upper face of the plate 11 and a downwardly projecting portion extending through the opening 15 and bifurcated to form a pair of spaced parallel legs 19 and 20. The lower ends of the legs 19 and 20 are widened sidewise as at 21 and 22, the upper and lower edges of the widened portions being inclined outwardly from the vertical. The detent lock extends upwardly from the widened portion and is similarly bifurcated to form a pair of spaced legs 23 and 24 which are widened sidewise at their upper ends as at 25 and 26, the side edges of the widened parts being inclined inwardly above and below. The legs 19 and 20 and 23 and 24 may be sprung inwardly to permit the widened portions 21, 22 and 25, 26 to pass between a pair of spaced locking surfaces as the inclined surfaces above and below the widened ends are pressed against the locking surfaces and to return to normal spaced position after the widened ends have passed through the space between the locking surfaces.

The lower part of the disconnect is secured to the under face of the bracket plate 11 by the detent legs 19 and 20. To this end the lower part of the disconnect has a downwardly opening recess to receive the legs 19 and 20 and a pair of spaced locking surfaces within the recess spaced so that the legs must be sprung toward each other to pass between the locking surfaces and then may return to lock the widened portions 21 and 22 beyond the locking surfaces, the lower part of the disconnect being thus locked to the bracket plate. The recess is formed by milling a slot through a block of metal 27 forming the lower part, the slot extending downwardly from the upper surface of the block and from front to back of the block in position to receive the legs 19 and 20 and of a width equal to the thickness of the legs. The locking surfaces of the recess are formed by a pair of spaced rods 28 and 29 set in holes drilled through the block and slot transverse to the slot and spaced to permit the widened ends 21 and 22 to pass therebetween and to hold these ends when the legs 19 and 20 spring back to their normal positions. The rods may be secured in position by screw threads or other means. The spaces in the slot on each side of the legs 19 and 20 may be closed by filler pieces 30 and 31 secured in position by screws 32.

The upper part of the disconnect is similarly formed of a block 33 in which an upwardly opening recess is formed by milling or otherwise forming a slot extending upwardly from the lower face of the block in position to receive the legs 23 and 24 of the detent lock. The locking surfaces of the recess are formed by drilling a pair of spaced holes in the block transverse to the slot and inserting and securing in these holes a pair of spaced rods 34 and 35. The spacing and positions of these rods are such as to permit the ends 25 and 26 to pass between them when the legs 23 and 24 are sprung toward each other and to hold the heads or widened portions and legs securely in position when the legs spring back to their normal positions. The spaces in the slot on each side of the legs 23 and 24 are filled by filler blocks 36 and 37 secured in place by transverse screws 38.

When assembled as in Fig. 3 with the widened part 18 of the detent lock resting on the upper face of the plate 11 and the legs 19 and 20 in the position shown, the lower part is secured to the under face of the plate 11. With the upper part mounted as shown in Fig. 3, it is held on the plate 11 by the lower part locked against the under surface of the plate. The sides of the widened parts of the ends of the legs 19, 20 and 34, 35 are inclined inwardly above and below so that when the legs of the detent lock are inserted into or withdrawn from the recesses, a wedging action of the rods 28, 29 or 34, 35, respectively, on these inclined edges compresses the legs to permit the widened parts 21, 22 or 25, 26 to pass upwardly or downwardly between the rods. An outward pull on either disconnect part will compress the legs to release the part. To prevent this release, a locking rod is provided for each set of legs spring pressed to slide vertically so that its end may enter between the legs to prevent them from springing inwardly. The locking rod for each disconnect part must be withdrawn to permit it to be separated from the bracket plate 11.

The locking rod for the lower disconnect part is slidably mounted in a thimble 39 set into a recess 40 in the lower end of the block 27 with its vertical axis in approximate alignment with the longitudinal center of the detent lock 17. The thimble 39 is secured in the recess by a securing plate 41 fastened to the lower face of the block by screws 42 and bearing against a flange 43 extending outwardly from the thimble. A locking rod 44 is mounted vertically in the thimble so that its upper end may move upwardly to a position between the legs 19 and 20 and with its lower end projecting through an opening in the bottom of the thimble. The locking rod is biased upwardly by a spring 45 confined between the lower end of the thimble and a flange 46 on the locking rod. The lower end of the locking rod is secured to a collar 47 in the lower end of which is rotatably secured the head 48 of a lanyard 49.

Normally the lower disconnect part remains in the position shown in Fig. 3. The lanyard 49 permits limited movement of the seat and bracket 10 without affecting the locking rod 44. When the seat is ejected in bailing out in an emergency, the lanyard, being secured to the aircraft, pulls the locking rod downwardly against the pressure of the spring 45, withdrawing the upper end of the rod from between the legs 19 and 20 and then, when the flange 46 has compressed the spring 45 to its limit of compression, pulls the lower disconnect part downwardly bending the legs 19 and 20 toward each other to permit them to pass downwardly between the rods 28 and 29. The lower part 27 of the disconnect is then free from the bracket 10 and the seat and from the upper part 33. The legs 19 and 20 may be drawn upwardly through the opening 15 in the bracket plate 11 when the pilot frees himself from the seat after the opening of his parachute. In assembling the lower part 27 on the bracket it is, of course, necessary only to push the lower part 27 upwardly in position so that the legs enter the recess in the lower part until the ends of the legs 19 and 20 pass below the rods 28 and 29. The ends of the legs in passing downwardly between the rods 28 and 29 abut the end of the rod 44, pushing it downwardly against the action of the spring 45 until the legs 19 and 20 have reached their limit of downward movement and spring back to their normal, spaced position whereupon the rod 44 is moved upwardly by the spring 45 to place its upper end between the legs 19 and 20, locking these legs and thus positively holding the lower part to the bracket plate 11.

The upper part 33 is attached to the suit of the pilot and must be connected to the lower part when he enters the aircraft and is seated preparatory to flight and must be removed after completing a flight and before leaving the aircraft. The locking rod for the upper part 33 is therefore manually operable by the pilot.

A locking rod 50 is therefore provided to slide vertically in a vertically extending recess 51 in an upward extension 52 of the block 33. The rod 50 is biased downwardly by a coil spring 53 confined between a plate 54 secured to the rod by a pin 55 and a plate 56 secured in the upper part of the recess 51 and through which the rod 50 projects.

Upon entering the aircraft and being seated, the pilot merely pushes the upper part of the disconnect downwardly. As the locking rods 34 and 35 reach the upwardly and inwardly inclined sides of the widened portions 25 and 26 and press the legs 23 and 24 toward each other the locking rod 50 abuts the ends of the legs and is pushed upwardly against the force of the spring 53 until the widened parts have passed above the rods 34 and 35 and spring apart whereupon the locking rod is forced downwardly by the spring 53 until the lower end of the rod is between the upper ends of the legs. As the inserted end of the locking rod prevents the legs from being sprung toward each other the upper part of the disconnect is locked securely in place. When the pilot leaves the seat he draws the rod 50 upwardly from between the legs 23 and 24 thus freeing them so that they may be sprung toward each other and then when the rod reaches the upper limit of its travel in the recess 51 and the upward pull on the rod 50 is continued the upper part moves upwardly, the rods 34 and 35 riding on the downwardly inclined sides of the widened parts 25 and 26 of the legs, pressing them toward each other and thus freeing the upper part of the disconnect. The upper end of the rod 50 is provided with a handle 57 to enable it to be grasped by the pilot.

To prevent accidental withdrawal of the rod 50 and upper disconnect part the rod 50 is rotatable to and from a locking position in which it can not be drawn upwardly. To this end a filler plate 58 is provided above the plate 56 and this filler plate has a cut out portion 59 of about 90° in which a pin 60 projecting sidewise from the rod 50 may swing as shown in Fig. 10. Above the filler plate 58 is a second filler plate 61 having a vertical slot 62 of just sufficient width to permit the pin 60 to move freely upwardly and downwardly therein. The filler plates 58 and 61 are so positioned in the upper part of the recess 51 that the recess 62 aligns with one side of the cut out 59. The lowermost plate 56 is supported on a shoulder 63 in the recess 51 and the uppermost plate is held against the lower plates by a cover plate 64 secured to the upper part of the disconnect about the recess 51 by means of screws 65 as shown in Fig. 4, the rod 50 sliding freely in an opening in the cover plate. To prevent the rod 50 from being accidentally turned from locking position to unlocking position the upper surface of the plate 56 is provided with radial depressions 66, Figs. 3 and 8, immediately below the slot 62 in whatever angular position this slot may be placed, the depressions being of a width equal to the diameter of the pin 60. The pin 60 is pressed into one of these depressions by the spring 53 and before the rod 50 and pin 60 can be rotated, the rod must be lifted slightly out of the depression.

In different installations of the disconnect in different aircraft it may be required that the locking position of the rod 50 be set in correspondingly different angular positions. This is accomplished in the present invention by adjusting the angular positions of the discs 58 and 61 in one of four positions at 90° angles to each other. For this purpose the plate or disc 58 is provided with a radial projection 67 and the plate 61 with a corresponding is provided with four vertical grooves 69 at 90° distance from each other into any one of which the projections 67 and 68 may be inserted to provide four locking positions 90° apart.

The upper and lower parts of the disconnect are provided with recesses in which the upper and lower elements, respectively, of the electrical connections may be placed and secured and which may be closed by demountable plates. As shown in Fig. 2 the upper part has a recess 70 opening to one side of the block 33 and to the bottom thereof and having an extension to the back of the block. This recess also extends at its lower end to the front and back of the block to receive an insulating block 71 containing the terminals of the electric wires and jacks to be inserted in sockets of a lower block mounted in the lower disconnect part. The terminal block 71 is secured in the recess 70 by screws 72 or other securing means. The wires extending from the block 71 extend upwardly and out through the backwardly opening extension. After the terminal block has been secured in the recess 70 and the wires placed to extend through the backwardly opening extension, the recess is closed by a plate 73 covering the side of the recess and extending over the front and back of the block and secured to the block by screws 74 and 75 in the back and front extensions.

The lower part of the disconnect is provided with a recess extending from the front to the back of the block 27 to receive a lower terminal block 76 and a downwardly extending slot 77 for the lead wires from the block 76. The lower terminal block 76 is secured in the block 27 by means of screws 78 and is in position to project through the opening 14 in the bracket plate 11 and is in alignment with the upper terminal block to receive the jacks projecting downwardly therefrom in corresponding sockets in the lower terminal blocks. The recess is closed by a plate 79 extending over the side of the block 27 and about the front and side to a limited distance and secured to the block by screws 80 passing through the front and back parts of the plate. The bottom of the slot 77 is closed by the plate 41 except for an opening 81 for the passage of the wires leading from the terminal block 76.

The above mounting of the electric circuits has the advantage that the terminal blocks may be assembled in a bench assembly and then secured accurately and easily to the blocks 27 and 33 and then closed by the plates 73, 79 and 41.

Oxygen is supplied to an inlet chamber 82 in the lower disconnect part through a nipple 83 extending downwardly from a plate 84 secured by screws, or otherwise, to the bottom of the disconnect part to close the chamber 82. The plate is sealed in the chamber by a nipple 85 having a sealing ring 86 set in an annular groove in the outer surface of this nipple. After passing through the nipple 83 the oxygen enters a cylindrical recess 87 in the bottom of a valve 88 thence passes upwardly into a pocket 89 in the valve and through side passages 90 into the inlet chamber. When the upper part of the disconnect is removed the valve 88 is pressed upwardly by a spring 91 confined between the plate 84 and the upper end of the recess 87 until a resilient valve ring 92 set in the upper end of the valve abuts the upper inclined end of the intake chamber 82 and closes it. The valve 88 may be positioned in the inlet chamber through its open lower end and the closing plate 84 carrying the spring 91 secured to the lower end of the disconnect part.

When the upper part of the disconnect is mounted on the bracket plate 11 the valve 88 is displaced downwardly against the action of the spring 91 by the lower end of a conduit 93 secured in the upper part and projecting downwardly into the inlet chamber 82. The conduit 93 has transverse openings 94 above the valve ring 92 through which the oxygen may pass from the inlet chamber 82 into the conduit. The conduit has a mid portion 95 of enlarged diameter fitting into and extending through a hole extending vertically through the block 33 and is secured to the block by a plate 96 secured to the block by screws 97, Fig. 8, and fitting into an annular recess or groove 98 in the mid portion. The part of the mid portion 95 projecting below the block 33 has an annular groove into which is fitted a sealing ring 99 which fits an opening 100 in the block 27 of the lower part and seals the conduit fluid tightly therein when the upper and lower parts are assembled.

To protect the lower electric terminal of the lower disconnect part a cover 101 is provided having a pair of spaced plates 102 to receive the legs 23 and 24 and transverse spaced pieces 103 to engage the ends of the legs when the upper part is removed. The cover may be attached to lower disconnect part by a chain 104.

The above invention provides a disconnect which is simpler to construct and may be made small in size and which does not require excessively close tolerances in the several parts. The wiring of the electrical components as a bench sub assembly and installing this sub assembly to the disconnect blocks improves inspection facility and servicing in the field and reduces assembly time. The manual lock assembly is readily producible and permits any locking orientation specified by the customer.

Having described my invention, what I claim is:

1. A disconnect for the electric connections and oxygen supply to aircraft personnel which comprises an upper disconnect block to be seated on a horizontal plate and having a transverse slot extending upwardly from its lower surface and a vertical bore extending downwardly to said slot, a pair of horizontally spaced detent holding elements in said slot, a lower disconnect block to be held to the under surface of a horizontal plate and having a transverse slot extending downwardly from its upper surface and a bore extending upwardly to said slot, a pair of horizontally spaced detent holding elements in said slot, a detent element comprising a flat plate having a widened mid portion to rest on a horizontal plate and bifurcated above and below said widened portion to form a pair of spaced, upwardly extending legs to enter the slot of said upper block and a pair of spaced, downwardly extending, legs to enter the slot of the lower block, the upper and lower ends, respectively, of said upper and lower legs being widened sidewise outwardly so that they may pass between the detent holding elements of their respective blocks upon inward springing of the legs and be engaged by said elements upon passing said detent holding elements, an upper detent locking and release rod vertically slidable in the bore of said upper disconnect block and spring pressed to enter between the upper legs of said detent when said upper ends are above said detent holding elements and a lower detent locking and release rod vertically slidable in the bore of the lower disconnect block and spring pressed to enter between the ends of the lower detent legs when said ends are below the detent holding element of the lower disconnect block.

2. The disconnect of claim 1 in which the detent locking and release rod of the lower block is provided with a lanyard for attachment to an aircraft.

3. The disconnect of claim 1 in which the detent locking and release rod of the upper block is rotatable about its axis and is provided with a sidewise extending pin and in which said upper block has a vertical groove in which said sidewise extending pin may move vertically and a sidewise extension at the lower part of said groove to permit partial turning of said rod and pin to lock said rod from upward movement.

4. The disconnect of claim 3 in which the upper block has a closing plate above said vertical slot through which said locking and release rod extends and which closes the upper end of the groove to limit the upper movement of the rod and has a disc below the groove to limit the lower movement of the rod, said disc having a radial groove in its upper surface to receive said sidewise extending pin and a spring resiliently pressing said rod downwardly to engage said sidewise extending pin in said radial groove.

5. The disconnect of claim 1 having a pair of filler pieces for the upper and lower blocks closing the slots at opposite sides of said detent arms.

6. The disconnect of claim 1 in which each of the upper and lower blocks has a recess in one side to receive the upper and lower parts, respectively, of a separable electric connection and a side plate to enclose said respective electric connections.

7. The disconnect of claim 1 in which the detent holding elements are transverse rods extending through the slots of their respective blocks.

8. A disconnect for the electric connections and oxygen supply to aircraft personnel which comprises an upper disconnect part and a lower disconnect part, and a detent to hold said parts to the upper and lower surfaces, respectively, of a supporting plate, said detent being a flat metal plate widened sidewise at a mid-point to form a pair of lugs to rest on a support and bifurcated from its upper and lower ends to form a pair of spaced, upwardly extending spring legs and a pair of spaced, downwardly extending spring legs, the ends of said legs being widened sidewise, said upper and lower disconnect parts having upwardly and downwardly extending recesses, respectively, to receive said upwardly and downwardly extending legs, respectively, and having detent receiving surfaces in said recesses spaced to permit the widened ends of said legs to pass therebetween upon springing said legs toward each other and, upon passage therebetween to spring apart, locking the parts together, and a pair of independently and vertically movable locking and release elements, one for each part movable to positions between the legs of said detent, and springs to move said elements to position between said legs.

9. The disconnect of claim 8 in which said locking and release elements are vertical rods slidable vertically in their respective disconnect parts.

10. The disconnect of claim 9 in which said lower disconnect part has a thimble through which the locking and release rod extends, a retaining plate to hold said thimble on said part, a flange on said rod and a spring confined between said flange and the end of said thimble.

11. The disconnect of claim 9 having a collar rotatably mounted on the lower end of the lower locking and release rod and a lanyard secured to said collar.

12. The disconnect of claim 9 in which said upper part has a recess extending downwardly from its upper surface through which said locking and release rod extends, a pair of filler plates in said recess each filler plate having a radially extending lug and the recess having angularly spaced, vertical, grooves to receive the lugs in different angularly rotated positions of said plates, the upper plate having a vertical, radial groove to receive a radially extending pin on said rod and said rod having a radially extending pin and the lower plate having a widened groove below said vertical, radial groove to permit said pin to turn out of alignment with the groove in the upper plate as said rod is rotated on its axis and a cap plate above said upper filler plate and secured to said upper disconnect part.

13. The disconnect of claim 8 having a sidewise recess in each of the disconnect parts to receive the wires and terminal blocks of the electric system and a plate for each recess to close said recess.

14. The disconnect of claim 8 in which said lower part has a vertical chamber contracted to form an inlet chamber and a valve seat at the upper end of said chamber, a valve element movable vertically to seat on said valve seat and having a passage therethrough below said valve seat and a spring biasing said valve upwardly to seat on said valve seat, said upper disconnect having a conduit positioned to enter and seal into said passage in said lower part and having a part projecting through said contracted part to abut and press said valve element from said valve seat.

References Cited in the file of this patent

UNITED STATES PATENTS

| | | |
|---|---|---|
| 370,605 | Carpenter | Sept. 27, 1887 |
| 2,482,292 | Sabbia | Sept. 20, 1949 |
| 2,494,207 | Sabbia | Jan. 10, 1950 |
| 2,621,875 | Darling | Dec. 16, 1952 |